(12) United States Patent
Butt et al.

(10) Patent No.: US 11,967,342 B2
(45) Date of Patent: *Apr. 23, 2024

(54) HEADER DECODING MECHANISM FOR TAPE STORAGE

(71) Applicant: INTERNATIONAL BUSINESS MACHINES CORPORATION, Armonk, NY (US)

(72) Inventors: Kevin Dale Butt, Tucson, AZ (US); Roy Cideciyan, Ruschlikon (CH); Simeon Furrer, Altdorf (CH); Masayuki Iwanaga, Tokyo (JP); Keisuke Tanaka, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,744

(22) Filed: Sep. 14, 2022

(65) Prior Publication Data

US 2024/0087604 A1    Mar. 14, 2024

(51) Int. Cl.
*G11B 20/18*    (2006.01)
*G11B 20/10*    (2006.01)

(52) U.S. Cl.
CPC ...... *G11B 20/1813* (2013.01); *G11B 20/1037* (2013.01); *G11B 2020/1836* (2013.01); *G11B 2020/1843* (2013.01)

(58) Field of Classification Search
CPC ............ G11B 20/1813; G11B 20/1037; G11B 2020/1836; G11B 2020/1843
USPC .......................................................... 714/758
See application file for complete search history.

(56) References Cited

U.S. PATENT DOCUMENTS

| | | | |
|---|---|---|---|
| 8,375,272 B2 * | 2/2013 | Litsyn | H03M 13/2903 714/755 |
| 8,479,079 B2 | 7/2013 | Cideciyan et al. | |
| 8,645,800 B2 | 2/2014 | Cideciyan et al. | |
| 8,762,805 B2 | 6/2014 | Cideciyan et al. | |
| 8,869,011 B2 | 10/2014 | Cideciyan et al. | |

(Continued)

OTHER PUBLICATIONS

U.S. Appl. No. 17/944,737, filed Sep. 14, 2022.

(Continued)

*Primary Examiner* — Shelly A Chase
*Assistant Examiner* — Enam Ahmed
(74) *Attorney, Agent, or Firm* — KONRAD, RAYNES, DAVDA & VICTOR LLP; Rabindranath Dutta

(57) ABSTRACT

Mechanisms are provided to receive encoded header information stored on a tape of a tape drive, wherein the encoded header information has been generated by: generating, for a plurality of tracks of the tape of the tape drive, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks; and modifying, for writing to the tape of the tape drive, the first set of symbols of the plurality of tracks to include parity information corresponding to information included in the second set of symbols of the plurality of tracks. The received encoded header information is decoded.

20 Claims, 17 Drawing Sheets

(56) References Cited

U.S. PATENT DOCUMENTS

| | | | |
|---|---|---|---|
| 9,251,846 B2 | 2/2016 | Cideciyan et al. | |
| 9,548,760 B2 | 1/2017 | Cideciyan et al. | |
| 9,666,225 B2 | 5/2017 | Cideciyan et al. | |
| 11,216,196 B2 | 1/2022 | Goker et al. | |
| 2002/0069389 A1* | 6/2002 | Sollish | G11B 20/1426 |
| 2009/0063932 A1* | 3/2009 | Ishii | H04L 1/0086 |
| | | | 714/E11.032 |
| 2010/0095185 A1* | 4/2010 | Ganga | H04L 1/0058 |
| | | | 714/E11.032 |
| 2015/0058694 A1* | 2/2015 | El-Khamy | G06F 11/10 |
| | | | 714/758 |
| 2017/0270963 A1* | 9/2017 | Maeto | G11B 20/1833 |

OTHER PUBLICATIONS

List of IBM Patents and Applications Treated as Related, dated Sep. 14, 2022, 2pp.

Cideciyan, et al., "Research Report Product Codes for Data Storage on Magnetic Tapes", IEEE, 2016, 11pp.

\* cited by examiner

Protection of header bytes with cross-track Reed-Solomon coding
(Rewriting of header bytes that are same across all tracks to include two bytes of Reed-Solomon parity)

— 900

— 902

Two Reed-Solomon (RS) parity bytes per header in a CWI-4 Set where *BYTE 0 or BYTE 1 or BYTE 2 are overwritten with two RS parity bytes*, i.e., header overhead is not increased. In particular, the two RS parity bytes in a header are stored such that *three headers in three adjacent channels within a CWI-4 Set contain the first three bytes of information of CWI-4 identifier* assuming all write elements have written properly, and an adjacent wrap is not being read.

— 904

Improved header protection w/o an increase in format overhead

FIG. 9

HEADER DECODING MECHANISM FOR TAPE STORAGE

BACKGROUND

The disclosure relates to tape storage systems, and more specifically relate to a header decoding mechanism for tape storage.

In certain tape drives, variable-length blocks of data are received from a host interface and converted into fixed units known as data sets. These data sets are typically broken down into smaller fixed units known as sub data sets (SDS). Error correction coding is then performed on these sub data sets as a unit to protect the data contained therein.

To protect data in an SDS, conventional tape drives may organize a SDS into a two-dimensional array made up of rows and columns. Each row in the two-dimensional array may be made up of multiple (e.g., 2 or 4) interleaved data words. Error correction codes may then be generated for each row in the array and each column in the array to protect the data contained therein. This provides two dimensions of protection for data in the array since protection is provided for both the rows and columns. The two orthogonal error correcting codes corresponding to the rows and columns are typically referred to as C1 and C2 code, respectively. The C1 code is used to detect and correct errors in the rows of the SDS and the C2 code is used to detect and correct errors in the columns of the SDS. Once generated, the C1 and C2 error correction codes may be appended to the array for eventual storage on the magnetic tape medium. For example, when systematic Reed-Solomon Codes are used for C1 and C2, each C1 (or C2) codeword contains "data" and "parity" symbols. Encoding a C1 (or C2) codeword means that for the input data symbols, a number of parity symbols are generated, and the concatenation of the input data and the parity symbols represents the codeword.

In order for this error correction methodology to work, the codewords written to tape have to be reassembled into SDS, i.e., placed into the correct locations in the SDS. If the location of the codewords cannot be determined, then the error correction decoding cannot be applied. Therefore, the codeword location information is stored in a field called the header. In certain mechanisms, once error correction codes are appended to the array, one or more headers may be generated and appended to each row in the array. These headers generally store addressing information and other metadata associated with the data words in the array. The protection of data and headers are often coupled via various mechanisms in the SDS.

Reed-Solomon (RS) codes are a group of error-correcting codes that may be used for protection of data. RS codes operate on a block of data treated as a set of finite-field elements called symbols. Reed-Solomon codes are able to detect and correct multiple symbol errors.

SUMMARY OF THE PREFERRED EMBODIMENTS

Provided are a method, system, and computer program product in which mechanisms are provided to receive encoded header information stored on a tape of a tape drive, wherein the encoded header information has been generated by: generating, for a plurality of tracks of the tape of the tape drive, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks: and modifying, for writing to the tape of the tape drive, the first set of symbols of the plurality of tracks to include parity information corresponding to information included in the second set of symbols of the plurality of tracks. A decoding is performed of the received encoded header information.

In further embodiments, the decoding of the received encoded header information comprises: extracting the encoded header information; and executing operations via a first decoder that performs cross-track error correction decoding of the information stored in the second set of symbols of the plurality of tracks.

In yet further embodiments, the decoding of the received encoded header information further comprises: performing, via a second decoder, along-track majority decoding; and performing, via a third decoder, cross-track majority decoding.

In certain embodiments, the cross-track error correction decoding generates Codeword interleave designation (CWID) and Cyclic Redundancy Check (CRC) fields, wherein the along-track majority decoding generates Adjacent Wrap Toggle (AWT) and Write Pass Identifier (WPI) fields, and wherein the cross-track majority decoding generates Amble Flag (AF), Rewritten Flag (RF), Data Set Identifier Fragment (DSIF), and an Absolute Codeword Object Set Sequence Number (ACN) fields.

In additional embodiments, the first decoder is a Reed-Solomon decoder.

In yet additional embodiments, the received encoded header information is protected by header Error Correcting Code (ECC), wherein data information corresponding to the encoded header information is protected by data ECC, and the header ECC and the data ECC are computed independently of each other.

In further embodiments, within the encoded header information the parity information is distributed in a first portion of all of the first set of symbols over all of the plurality of tracks, and wherein a second portion of all of the first set of symbols over all of the plurality of tracks continues to store previously stored information.

BRIEF DESCRIPTION OF THE DRAWINGS

Referring now to the drawings in which like reference numbers represent corresponding parts throughout:

FIG. 9 illustrates a block diagram that shows mechanisms for the protection of header bytes with cross-track Reed-Solomon (RS) coding, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

The protection of data with product code based error correction schemes is strong in tape drives. However, protection of headers against errors in tape drives is weak. Headers play a key role during the decoding of data, especially when rewritten CWI-4s are decoded. At high raw bit error rates decoding of headers is not reliable and error performance of decoded data may degrade, because headers determine in which row of a SDS within a data set a CWI-4 is located. Therefore, certain embodiments provide mechanisms to improve header protection without increasing format overhead.

CWI-4 designation (CWID) header bytes and header Cyclic Redundancy Check (CRC) bytes in the headers of a CWI-4 set change across simultaneously written or read tracks. The header protection schemes provided in certain embodiments protect CWID header bytes and header CRC bytes separately from the protection of data and allow their decoding.

Certain embodiments present mechanisms for strong protection of CWI-4 Designation (CWID) and header CRC bytes independent of the protection of data with C1 and C2 codewords by replacing a subset of selected header bytes, which repeat across all tracks, with Reed-Solomon (RS) parity bytes. Furthermore, a header layout scheme for mapping header bytes to cross-track Reed-Solomon codewords is disclosed such that the ratio of modulation encoded bytes and unencoded bytes in each cross-track RS codewords is identical/constant, i.e., the number of header bytes that are prone to errors due to error propagation during modulation decoding is an integer constant in every Reed-Solomon code word, and the impact of dead (unreadable) tracks on error rate performance is minimized.

The new header protection and layout scheme of certain embodiments protects both CWID header bytes and header CRC bytes without increasing overhead. Protection of both CWID and header CRC bytes is very strong. The design of the new header protection and layout scheme ensures that the impact of non-uniform raw byte errors on all cross-track RS codewords is the same, i.e., there is no weakest link determining error performance. Protection of data and headers are decoupled, i.e., protection of data and headers are not integrated. Certain additional embodiments provide mechanisms for decoding of the encoded headers. The encoding and decoding mechanisms of certain embodiments improve the operation of a tape drive by allowing for the error correction of data and header bytes.

Figure 1:
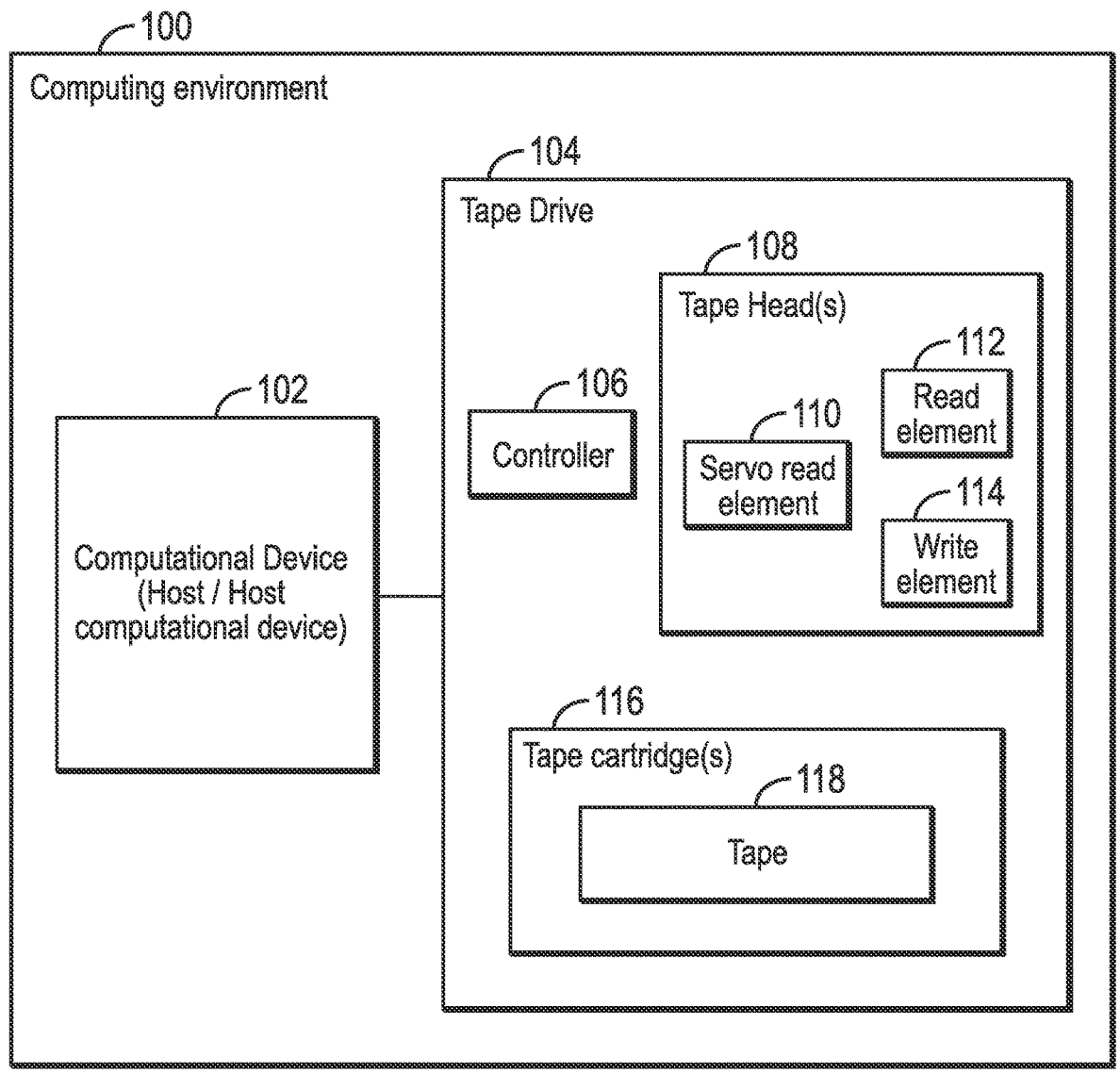
FIG. 1 illustrates a block diagram of a computing environment comprising a host computational device that is coupled to a tape drive, in accordance with certain embodiments.

FIG. 1 illustrates a block diagram of a computing environment 100 comprising a computational device 102 that is coupled to a tape drive 104, where the computational device 102 may also be referred to as a host or a host computational device. The host computational device 102 may comprise any suitable computational device known in the art, such as a desktop computer, a laptop, a client, a telephony device, a server, etc. The tape drive 104 includes a controller 106, tape heads 108 comprising one or more servo read elements 110 (also referred to as servo element), one or more read elements 112, and one or more write elements 114. A tape cartridge 116 is included in the tape drive 104, and the tape cartridge 116 may include a tape 118 that may comprise a magnetic tape.

The tape drive 104 may be coupled to the host computational device 102 either directly or via a network. In certain embodiments the tape drive 104 may reside within the host computational device 102.

The controller 106 included in the tape drive 104 controls the movement of the tape heads 108 and upon request from the host computational device 102 may write data to the tape 118 or may read data from the tape 118.

Error Correction Codes (ECC) are used for data storage in the tape 118 to achieve very low bit error rates under normal operating conditions. Linear block codes, such as Reed-Solomon (RS) codes and low-density parity-check (LDPC) codes, may comprise the ECC schemes used for tape.

Figure 2:
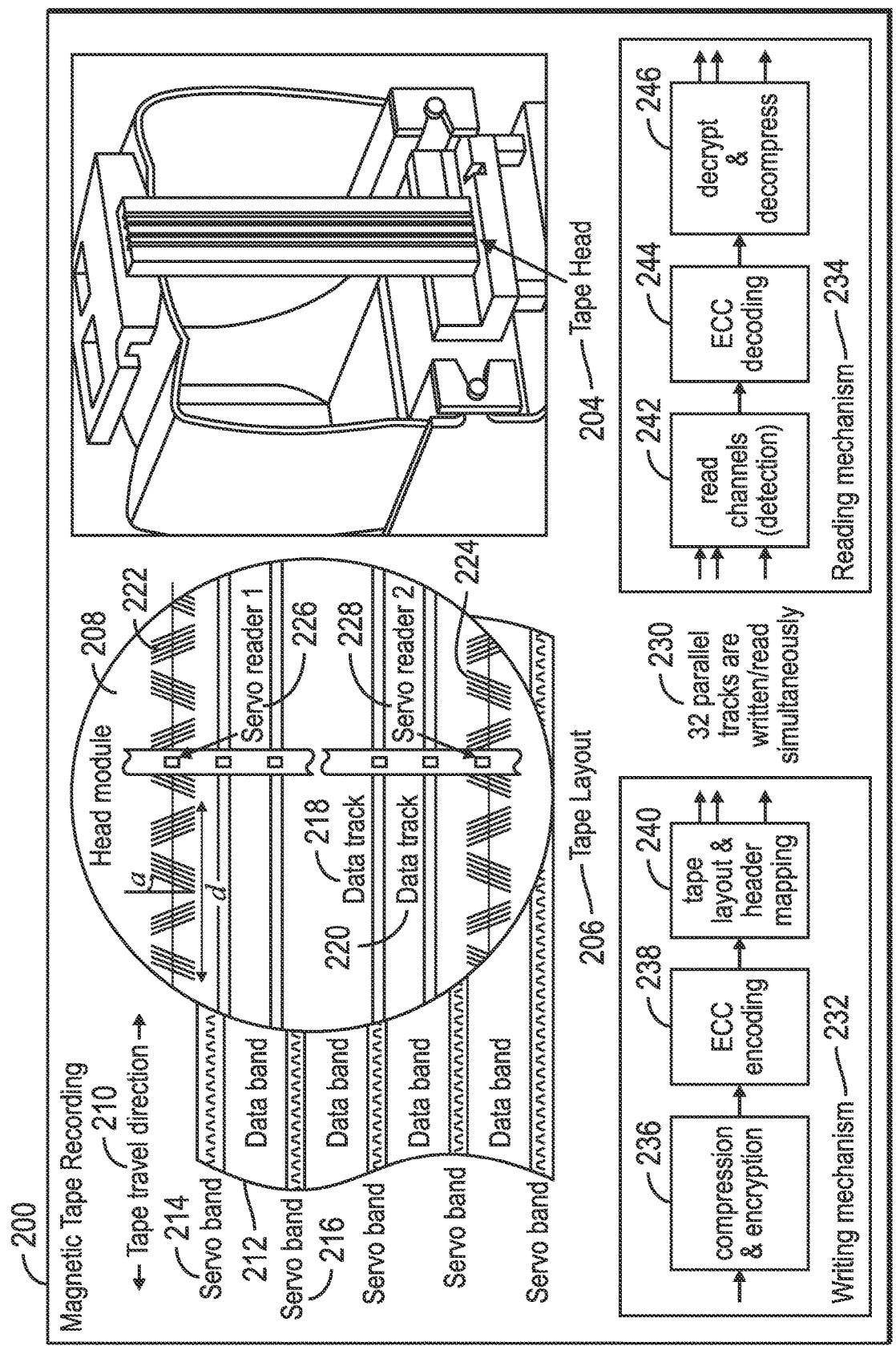
FIG. 2 illustrates a block diagram that depicts how data is recorded on a magnetic tape, in accordance with certain embodiments.

FIG. 2 shows a block diagram 200 that depicts how data is recorded on a magnetic tape, in accordance with certain embodiments. The magnetic tape may also be referred to as a tape. The tape may comprise a plastic film with a magnetic layer on top of the plastic film, where the magnetic layer may be referred to as the recording layer. Other types of tapes may also be possible.

The tape head 204 shown in FIG. 2 is comprised of three modules comprising one or more write elements, one or more read elements, and one or more servo elements. The write element writes, and behind the write element is a read element to verify that that the data has been written properly to tape. One write element is active in forward direction of tape movement and the other write element is active in the backward direction of tape movement. The read element may be positioned in between two write elements and is used for reading data. The servo elements read prewritten servo bands to ensure that the tape head is positioned right with respect to the tape for reading and writing. Various configurations and number of read, write and servo elements may be found in different types of tape heads.

A tape layout 206 along with a magnified section 208 of the tape layout 206 is shown in FIG. 2. The tape may move in the forward direction or backward direction as shown via reference numeral 210. A plurality of data bands 212 separated by servo bands 214, 216 may be present in the tape.

The magnified section 208 of the tape layout 206 shows that each data band is comprised of a plurality of data tracks 218, 220 written within two servo patterns 222, 224, where the servo patterns 222, 224 form servo tracks. In certain embodiments the plurality of data tracks 218, 220 may be 32 in number. The data tracks 218, 220 are also referred to as tracks, and the servo tracks including the servo patterns 222, 224 correspond to servo bands. The two servo readers 226, 228 read the servo patterns 222, 224 to ensure that the positioning of the tape head with respect to the tape is correct for reading or writing data. The servo patterns 222, 224 are prewritten by the tape manufacturer.

FIG. 2 shows that in certain embodiments 32 parallel tracks may be written or read simultaneously (reference numeral 230). The operations for the corresponding writing mechanism 232 and reading mechanism 234 are also shown in FIG. 2.

In the writing mechanism 232, the data received from the host 102 first undergoes compression and encryption (as shown via reference numeral 236). The compressed and encrypted data then undergoes ECC encoding (as shown via reference numeral 238). Then the ECC encrypted data is written to tape with appropriate headers (as shown via reference numeral 240).

In the reading mechanism 234, the operations start with the read channels detecting the written data and headers on the tape (shown via reference numeral 242). The read channels are inductive and detect bits written on tape. Then, an ECC decoding is performed (as shown via reference numeral 244) to remove errors, followed by decryption and decompression (as shown via reference numeral 246) to determine the data.

Figure 3:
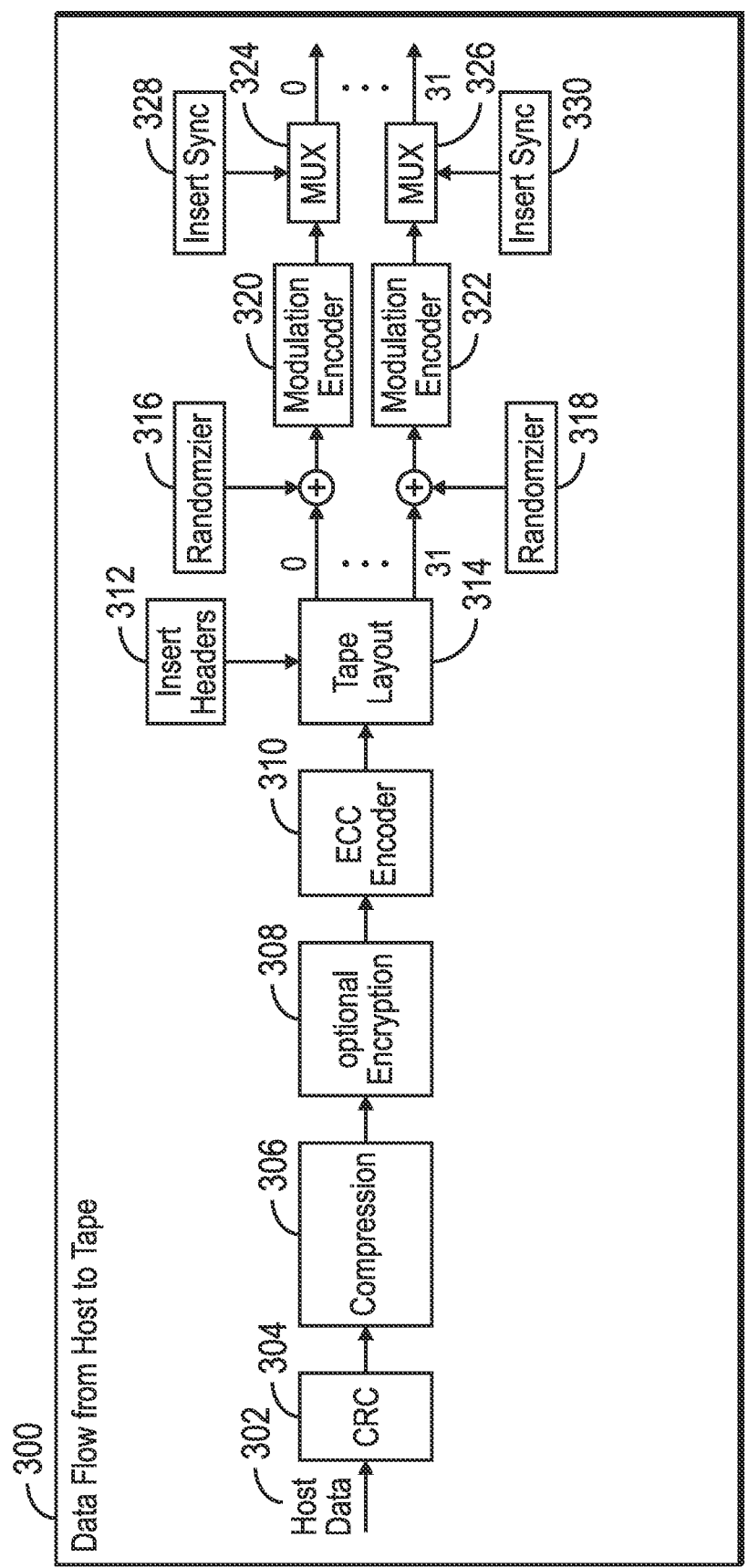
FIG. 3 illustrates a block diagram that depicts the data flow from the host to the tape, in accordance with certain embodiments.

FIG. 3 shows a block diagram 300 that depicts the data flow from the host 102 to the tape 118. FIG. 3 shows a system for encoding data in a tape drive with 32 simultaneously written tracks. Any number of tracks may be written to a magnetic medium, such as 4 tracks, 8 tracks, 16 tracks, 32 tracks, 64 tracks, etc. Furthermore, in certain embodiments any type of storage medium may be used, such as magnetic tape, optical disk (such as CD-ROM, DVD-ROM, Blu-Ray, etc.), hard disk, etc.

The host data 302 received from the host 102 by the tape drive 104 first undergoes a cyclic redundancy check (CRC) 304 followed by a compression 306 and an optional encryption 308. Then at block 310 an ECC encoder is used to perform an ECC encoding, and an insertion of headers is performed at block 312 to generate the tape layout 314. During the ECC encoding process, parity bytes are added to the data (e.g., via Reed Solomon based two dimensional code for data protection), and the data is broken into small chunks, and each chunk is made to include a header before the chunk with the ECC encoded data and headers are written on the tape. There is a processing and storage overhead for performing ECC encoding of data and for writing the header The blocks shown in FIG. 3, also include scrambling (e.g., 32 randomizers numbered 0 to 31 adapted for data randomization in each channel shown via reference numerals 316, 318). Also shown are modulation encoders 320, 322, and individual channel multiplexers 324, 326 for inserting synchronization sequences/marks 328, 330 for each of the 32 tracks numbered 0 to 31.

In one approach, the storage medium on which ECC encoded data and headers are written may be a magnetic tape, and components of the system may comprise logic adapted for parsing the encoded data into a plurality of tracks prior to writing the encoded data to the magnetic tape.

In FIG. 3, the ECC encoder module 310 may be used for inserting a product code comprising C1 and C2 Reed-Solomon codes into sub data sets (SDS). A fundamental data block having four interleaved codewords therein written on each track is referred to as a Codeword Interleave-4 (CWI-4). "Codeword Interleave" refers to more than one (four in the case of CWI-4) Reed-Solomon (RS) codewords being interleaved when they are written onto magnetic tape.

Figure 4:
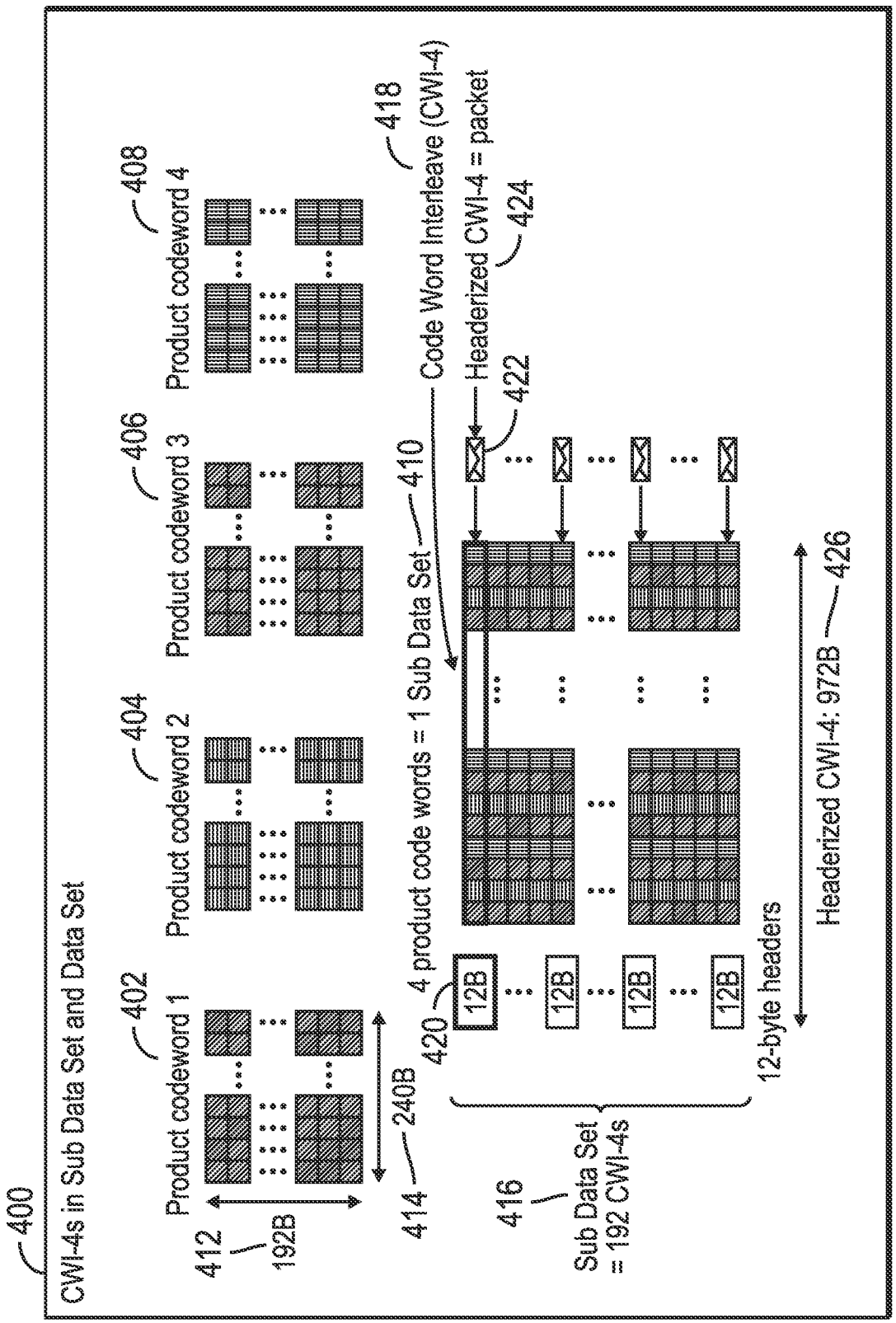
FIG. 4 illustrates a block diagram that shows Codeword Interleave-4 (CWI-4) elements in sub data set and data set, in accordance with certain embodiments.

FIG. 4 shows a block diagram 400 that shows CWI-4s in sub data set and data set. In FIG. 4, four product codewords 402, 404, 406, 408 comprise a sub data set (as shown via reference numeral 410). Each product codeword is 192 bytes by 240 bytes as shown via reference numerals 412, 414. Each product code word is comprised of user data and parity bytes (ECC information).

A single sub data set 416 is formed of 192 CWI-4s, where each CWI-4 is a row 418 as shown in FIG. 4. A 12-byte header 420 is added to each CWI-4 to generate a packet 422 that is also referred to as a headerized CWI-4 packet 424. The 12-byte header of a packet stores metadata of the data stored in the packet, including the location of the data. Each packet (i.e., headerized CWI-4) is about 1 kilobyte (actually 972 bytes which is slightly less than 1 kilobyte as shown via reference numeral 426 in FIG. 4).

Therefore, each sub data set has 192 rows and 972 columns of byte information (as shown via reference numerals 416 and 420). The number of columns are 972 because 4 codewords of 240 bytes together form 4×240, i.e., 960 bytes, and then 12 bytes of header information are added.

Therefore, FIG. 4 shows how headers are added to data to which ECC has been included. FIG. 4 shows as how user data is logically transformed to product code words and how product code words are assembled into a sub data set, and how packets (headerized CWI-4) are formed where each packet has a 12 byte header.

Figure 5:
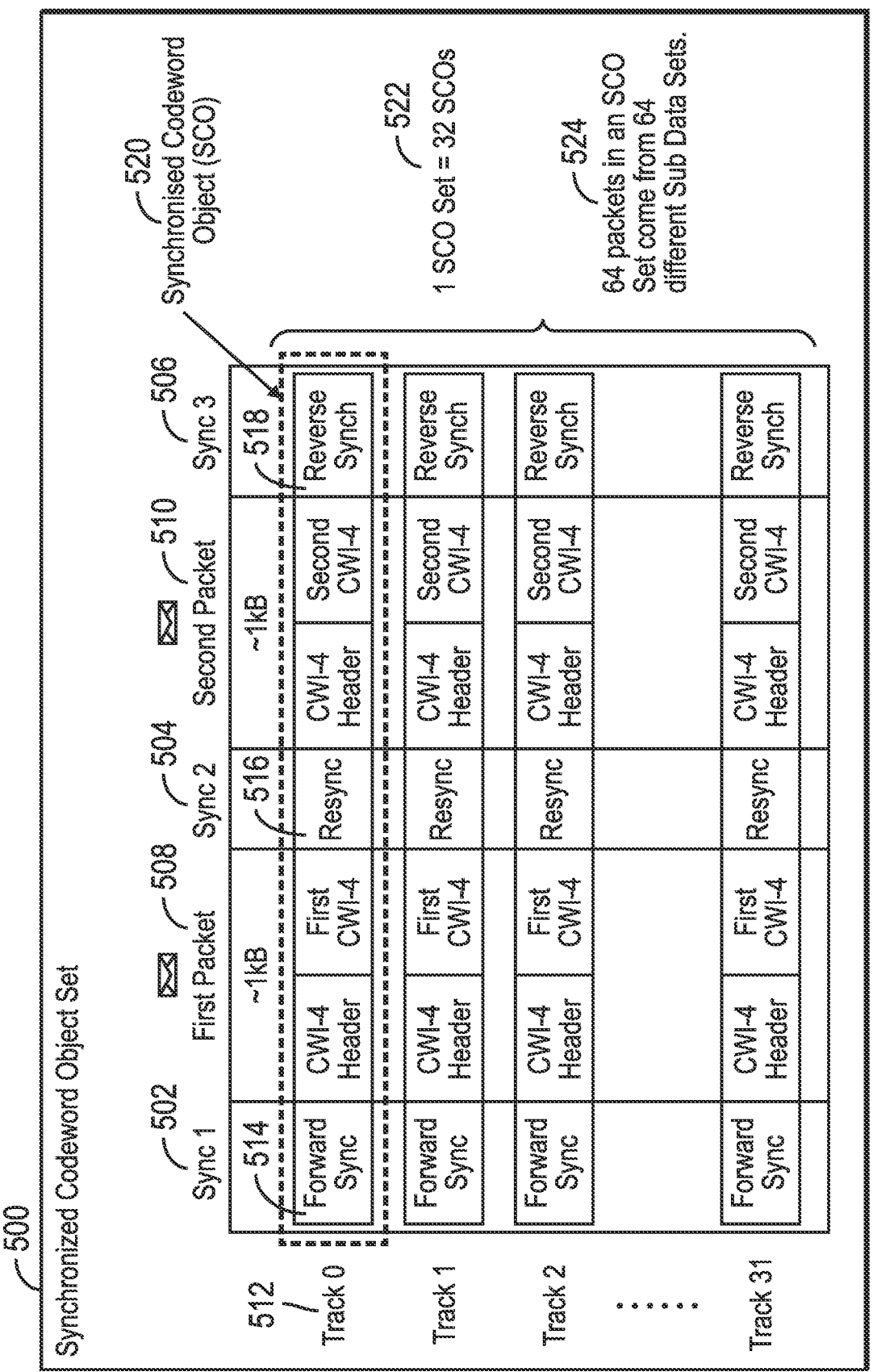
FIG. 5 illustrates a block diagram of a synchronized codeword object set, in accordance with certain embodiments.

FIG. 5 shows block diagram 500 of a synchronized codeword object set, in accordance with certain embodiments.

In certain embodiments, after modulation encoding three synchronization patterns 502, 504, 506 are inserted with two CWI-4s 508, 510 (first and second packet) in a track 512. For example, two headerized CWI-4s (i.e., 2 packets) are concatenated within a forward sync, 514, a resync 516, and a reverse synch 518, and are together referred to as a synchronized codeword object (SCO) 520. One SCO Set is comprised of 32 SCOs, where each SCO is written on a separate track as shown in FIG. 5 (reference numeral 522). The 64 packets in a SCO set comes from 64 different sub data sets (as shown via reference numeral 524). In certain embodiments, the minimum amount of written and rewritten data is an SCO set.

Figure 6:
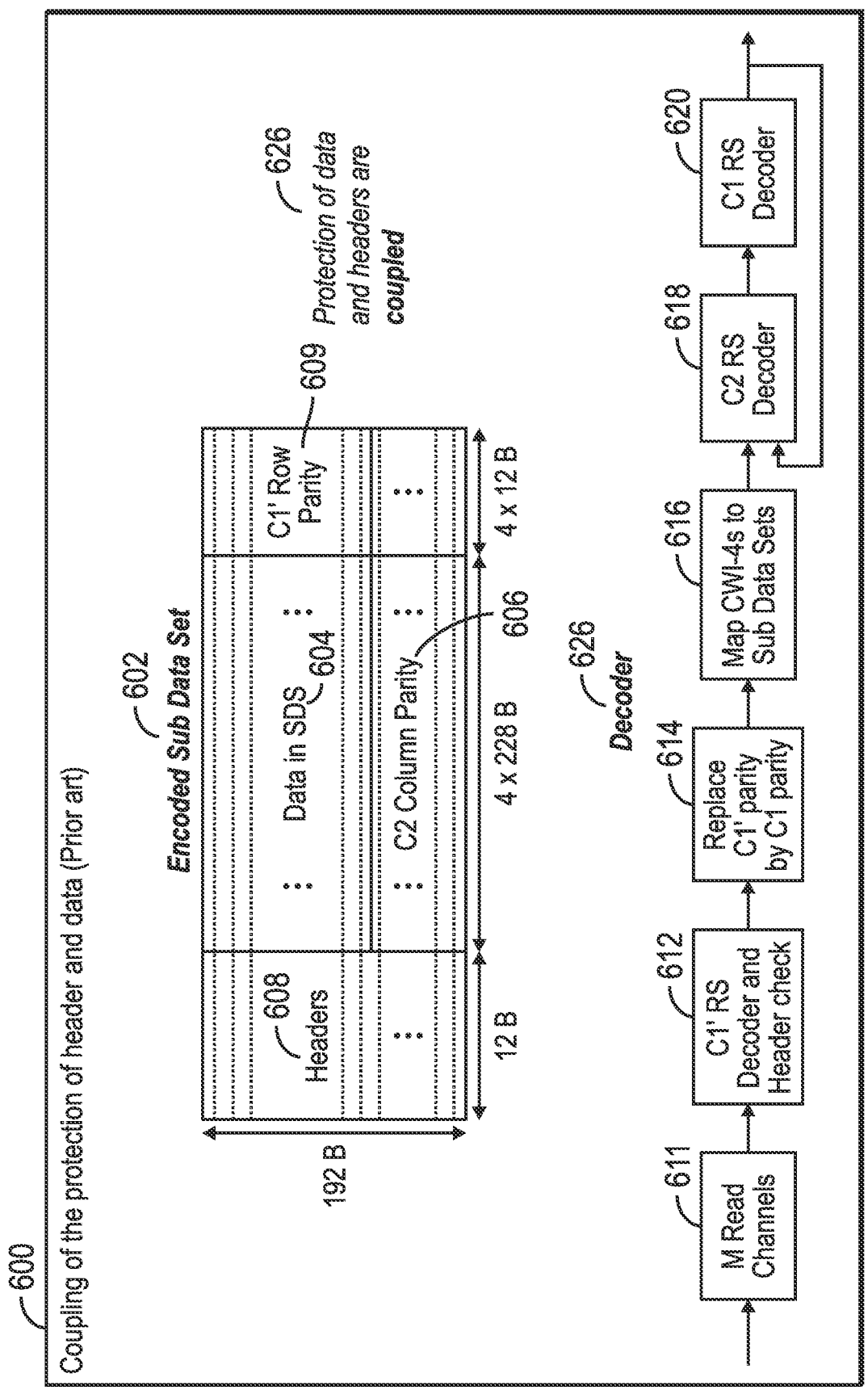
FIG. 6 illustrates a block diagram that shows the coupling of the protection of header and data, in accordance with certain embodiments.

FIG. 6 illustrates a block diagram 600 that shows the coupling of the protection of header and data, in accordance with certain embodiments.

Initially C1 row parity and C2 column parity are computed for the data 604 in the SDS, where the C2 column parity is shown via reference numeral 606. Then when headers 608 are added the C1 row parity is recomputed to include the header information and termed C1' row parity 609. The row parity is therefore recomputed on adding headers.

During decoding operations of the decoder 610, the M read channels (M is 32 in certain embodiments) are read 611, and then C1' Reed-Solomon decoding and header check is performed (at block 612) and the C1' parity is replaced by C1 parity (at block 614). Therefore, at this stage the headers are being detached/separated from the data. Based on the header information, the CWI-4s are subsequently mapped to the corresponding sub data sets (at block 616). Subsequently the C2 Reed-Solomon decoder 618 and the C1 Reed-Solomon decoder 620 are executed to error correct the data.

Therefore, in an encoded SDS 602 the headers 608 are protected by C1' code, repetition code, and cyclic redundancy code (CRC), whereas the data in SDS is protected by both C1 code and C2 code. The protection of data and headers are therefore coupled (reference numeral 626). However, there is an unequal protection of headers and data, as unlike for the data there is no column parity computed for the headers. There is greater protection for the data than for the header.

Therefore in FIG. 6, the headers may be encoded using a C1' encoding scheme by modifying the C1 row parity to account for the headers by using a C1 parity modifying mechanism. In such embodiments, headers are protected by one-level ECC (C1' code) whereas the data is protected by two-level (two-dimensional) ECC comprising C1 and C2 code.

Furthermore, the coupling of the headers and data for error correction means that if C1' decoding fails due to too many errors in either the data or header bytes or both, the header may not be recoverable, and as a consequence, the data cannot be mapped to the corresponding SDS and therefore cannot be used for ECC decoding of the data (product codewords comprising C1 and C2 component codes).

In the existing scheme shown in FIG. 6 there is no space left to add column parity for the headers and the headers are weakly protected by row parity only, whereas the data is strongly protected by both row and column parity. Certain embodiments provided below decouple the protection of header and data and improve the protection of headers.

Figure 7:
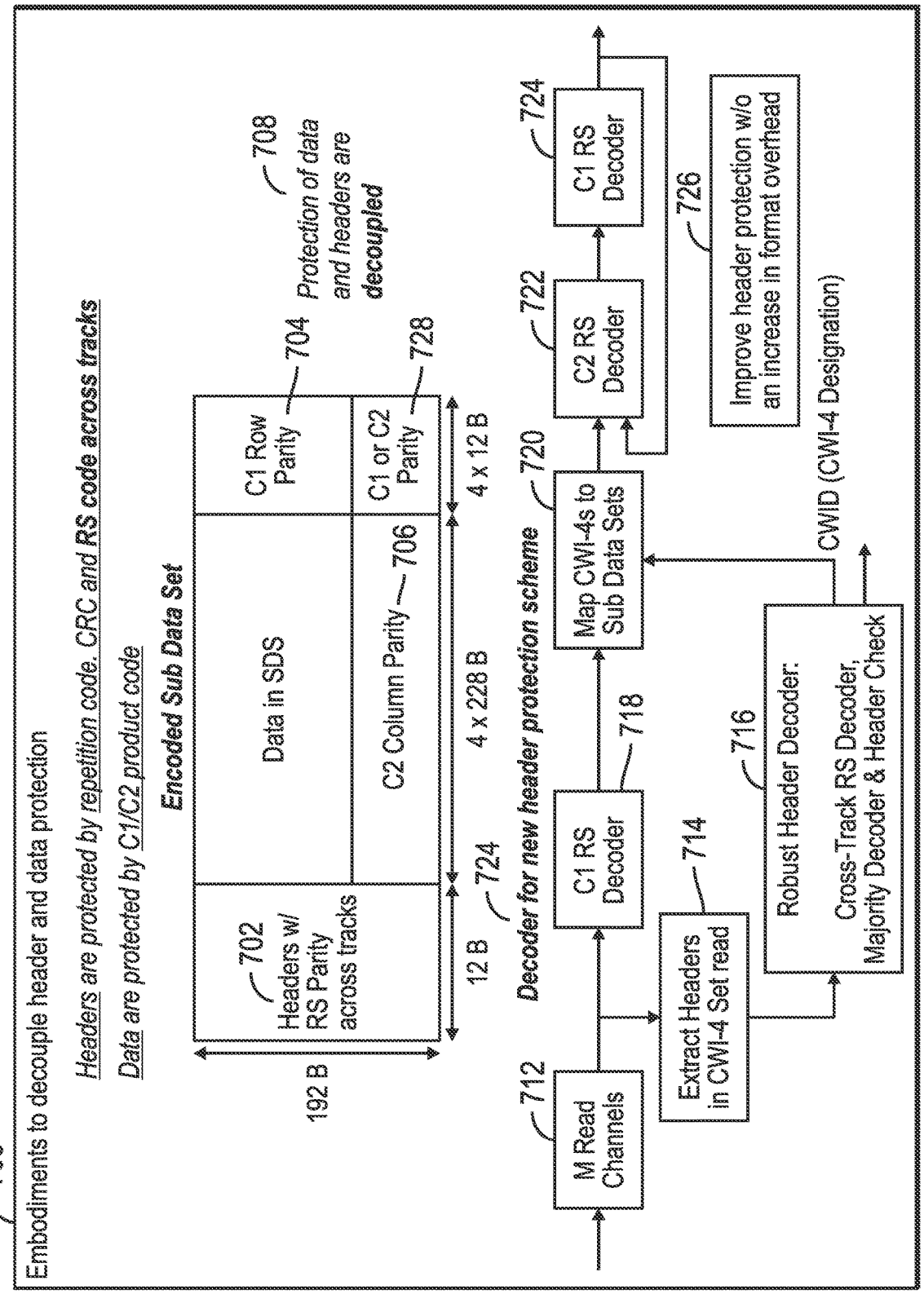
FIG. 7 illustrates a block diagram that shows the decoupling of the protection of header and data, in accordance with certain embodiments.

FIG. 7 illustrates a block diagram 700 that shows the decoupling of the protection of header and data, in accordance with certain embodiments.

In the encoding scheme shown in FIG. 7, the headers are protected by repetition code, CRC, and Reed-Solomon code across tracks (reference numeral 702), and the data are protected by C1 and C2 product codes (reference numerals 704, 706). As a result, the protection of data and headers is completely decoupled, and there is no need to compute a C1' code (reference numeral 708) unlike the mechanisms shown in FIG. 6. The embodiments shown in FIG. 7 reuse duplicative information that is present in the headers to create adequate space for storing the RS parity symbols across all M simultaneously written tracks exclusively for the headers (as shown via reference numeral 702).

During decoding operations of the decoder 710 for the new header protection scheme of FIG. 7, the M read channels (M is 32 in certain embodiments) 712 return the detected information corresponding to a CWI-4 set, and then the headers are extracted in CWI-4 set read 714 via the robust header decoder 716 that comprises a cross-track Reed-Solomon decoder, one or more majority decoder, and a header checker. Along with the C1 Reed-Solomon decoder 718 the CWI-4s are mapped to sub data sets (at block 720) and then the C2 Reed-Solomon decoder 722 and the C1 Reed-Solomon decoder 724 are used to recover the data. As a result, header protection is improved without an increase in format overhead (as shown via reference numeral 726).

It should be noted that in certain embodiments the C1 row parity 704 and C2 column parity 706 are used to compute a measure that is referred to as "C1 or C2 Parity" that stores parity of both rows and columns of C1 and C2 (as shown via reference numeral 728). In FIG. 7, reference numeral 728 represents the "C1 AND C2", or "parity of parity". This is because in the C1-C2 product codeword, each row is a C1 codeword, and each column is a C2 codeword, both linear codes. Whether rows or columns are encoded first does not matter, because the "C1 AND C2" 728 ends up being the same.

Therefore, FIG. 7 illustrates certain embodiments to decouple the protection of header and data. In order to perform the decoupling, without the need to increase the number of header bytes (overhead), duplicative elements in headers are identified in embodiments described below.

Figure 8:
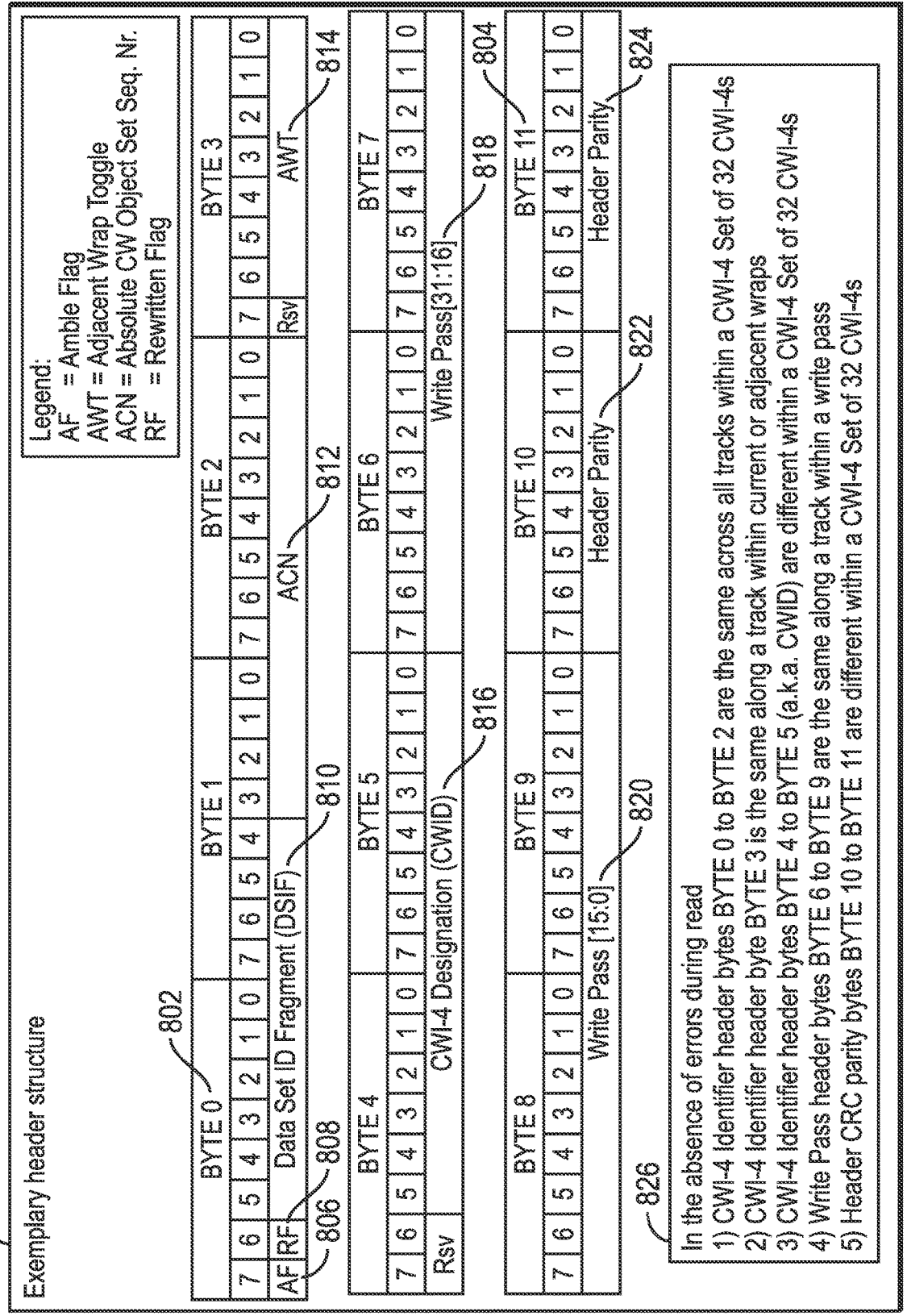
FIG. 8 illustrates a block diagram that shows the overview of an exemplary header structure, in accordance with certain embodiments.

FIG. 8 illustrates a block diagram 800 that shows the overview of an exemplary header structure, in accordance with certain embodiments. A header is shown to be comprised of 12 bytes that range from byte 0 (reference numeral 802) to byte 11 (reference numeral 804).

In FIG. 8, the data structures in the header structure include the Amble Flag (AF) field 806, the Rewritten Flag (RF) field 808, the data set identifier fragment (DSIF) field 810, the Absolute Codeword Object Set Sequence Number (ACN) field 812, the adjacent wrap toggle (AWT) field 814, and the CWI-4 designation field (CWID) 816. The Write Pass Identifier (WPI) field is included in 4 bytes labeled byte 6 to byte 9 (shown via reference numerals 818, 820). The header parity fields (sometimes referred to as header CRC bytes) are shown via reference numerals 822, 824. There are additionally certain reserved fields labeled "Rsv" in the header structure.

It may be noted that in the absence of errors during read the following is true (shown via reference numeral 826):
(1) CWI-4 identifier header bytes from byte 0 to byte 2 are the same across all tracks within a CWI-4 set of 32 CWI-4s;
(2) CWI-4-identifier header byte 3 is the same along a track within current or adjacent wraps;
(3) CWI-4 identifier header bytes from byte 4 to byte 5 (also known as CWID) are different within a CWI-4 set of 32 CWI-4s.
(4) Write Pass header bytes from byte 6 to byte 9 are the same along a track within a write pass; and
(5) Header CRC bytes from byte 10 to byte 11 are different within a CWI-4 set of 32 CWI-4s.

FIG. 9 illustrates a block diagram 900 that shows mechanisms for the protection of header bytes with cross-track Reed-Solomon coding, in accordance with certain embodiments. Certain initial header bytes that are the same across all tracks are replaced/substituted during the header encoding operation to include two bytes of Reed-Solomon parity.

In the embodiments shown in FIG. 9 two Reed-Solomon parity bytes are included per header in a CWI-4 set where byte 0 or byte 1 or byte 2 are overwritten with two Reed-Solomon parity bytes, i.e., header overhead is not increased. In particular, the two Reed-Solomon parity bytes in a header are stored such that three headers in three adjacent channels within a CWI-4 Set contain the first three bytes of information of CWI-4 identifier assuming all write elements have written properly, and an adjacent wrap is not being read (as shown via reference numeral 902). This results in an improved header protection scheme without an increase in format overhead (shown via reference numeral 904). In alternative embodiments, RS codes of different length/overhead may be used, and the number of parity bytes/symbols may be different (e.g., only one RS byte per header) too. It is also possible to use codes other than Reed-Solomon codes.

It may be noted that protection of header bytes with cross-track Reed-Solomon coding is scalable to L×32 channels where L is an integer. Embodiments need L times as many RS codewords to protect header bytes in a CWI-4 Set. The proposed concept of header protection may be used with any number of simultaneously written/read channels. The total number of channels does not have to be power of two as in all Linear Tape-Open (LTO) tape drives, i.e., it can be any integer.

Figure 10:
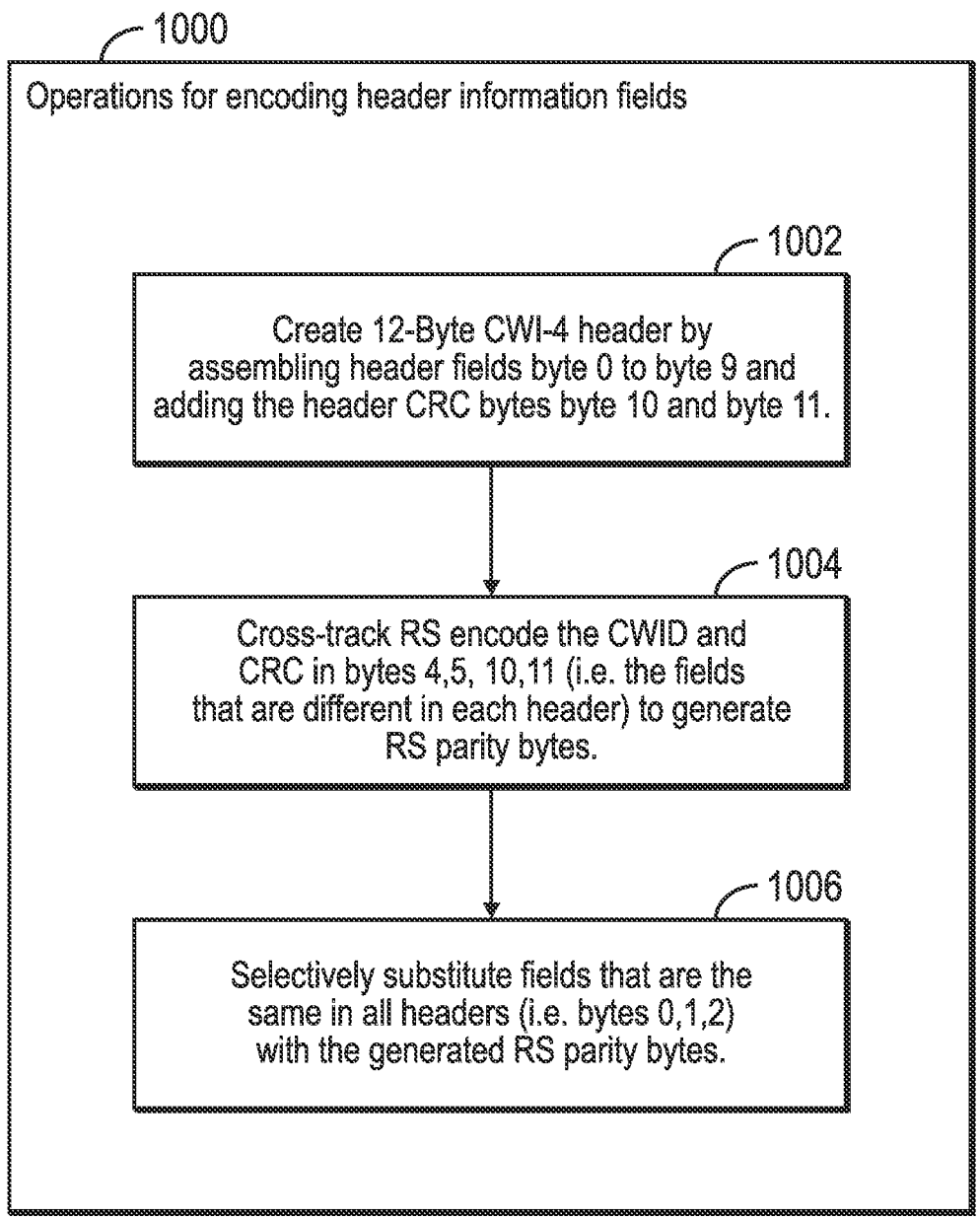
FIG. 10 illustrates a flow chart that shows cross-track encoding of CWID and CRC field, in accordance with certain embodiments.

FIG. 10 illustrates a flow chart 1000 that shows operations for cross-track encoding of CWID and header CRC field, in accordance with certain embodiments.

Control starts at block 1002 in which the controller 106 of the tape drive 104 creates a 12-Byte CWI-4 header by assembling header fields byte 0 to byte 9 and adding the header CRC in byte 10 and byte 11 (the header fields byte 0 to byte 11 have been shown in FIG. 8).

From block 1002 control proceeds to block 1004 in which the controller 106 of the tape drive 104 cross-track Reed-Solomon encodes the CWID and header CRC in bytes 4, 5, 10, 11, (i.e., the fields that are different in each header) to generate Reed-Solomon parity bytes.

Control proceeds to block 1006 in which the controller 106 of the tape drive 104 selectively substitutes fields that are the same in all headers (i.e., bytes 0, 1, 2 as shown in FIG. 8) with the generated Reed-Solomon parity bytes.

Figure 11:
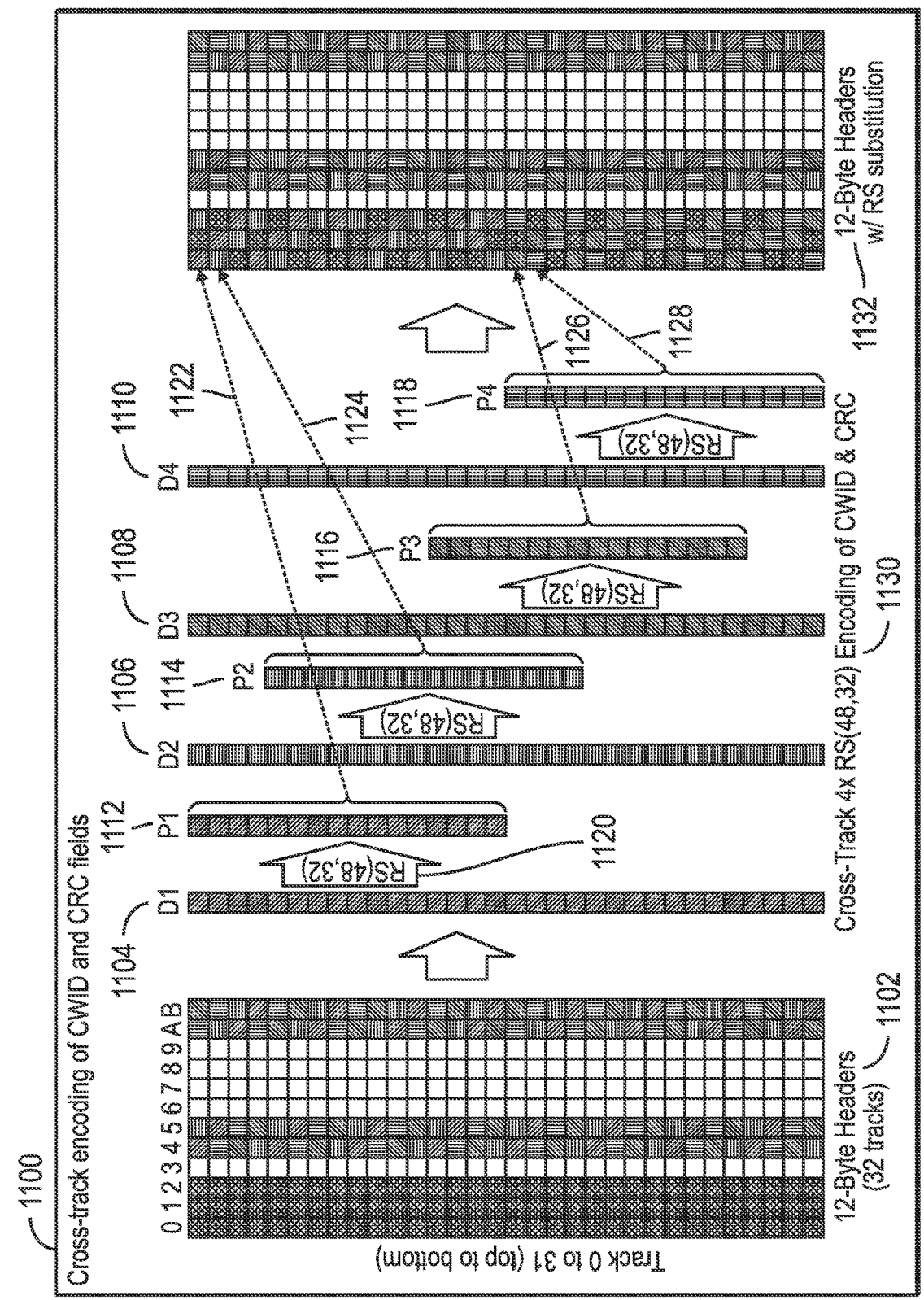
FIG. 11 illustrates a block diagram for cross-track encoding of CWI-4 designation (CWID) and Cyclic Redundancy Check (CRC) fields, in accordance with certain embodiments.

FIG. 11 illustrates a block diagram 1100 for cross-track encoding of CWID and header CRC by means of four Reed-Solomon codewords, in accordance with certain embodiments.

In the 12 byte headers shown for 32 tracks (shown via reference numeral 1102), bytes 0, 1, 2 are the same across all tracks, and bytes 4, 5 (the CWID fields as shown in FIG. 8) and bytes 10, 11 (the header CRC as shown in FIG. 8) may be different across all tracks.

In the 32 tracks there are thus 128 bytes that may be different across all tracks (byte locations 4, 5, 10, 11 in 32 tracks). These 128 bytes that may be different across all tracks are split into four segments and shown as D1, D2, D3, D4 via reference numerals 1104, 1106, 1108, 1110, each 32 bytes in length.

Reed-Solomon encoding is performed on each four 32 byte segments 1104, 1106, 1108, 1110 and therefore 16 parity bytes are generated and added to each segment as shown by the parity bytes P1, P2, P3, P4 (reference numerals 1112, 1114, 1116, 1118). The Reed-Solomon encoding shown as RS(48,32) 1120 indicates that to 32 bytes of information an additional 16 bytes of parity has been added to arrive at 48 bytes.

Once the Reed-Solomon encoding of the four 32 byte segments are complete, then the parities P1, P2, P3, P4 are placed (selectively substituted) in the bytes 0, 1, 2 that are same across 32 tracks (as shown via arrows 1122, 1124, 1126, 1128). For example, arrow 1122 shows that P1 is placed/selectively substituted in bytes 0, 1, 2 of the 32 tracks.

It may be noted that in positions 0, 1, 2 there are totally 96 bytes of which only 64 are utilized/substituted by the parities P1, P2, P3, P4. The remaining 32 bytes remain same across all tracks. The 64 bytes of parities P1, P2, P3, P4 may be distributed in many different ways in different embodiments within the 96 bytes of the 32 tracks of the bytes 0,1,2 of the header. In alternative embodiments, a different choice of code and/or redundancy would also lead to different substitution patterns.

Thus, FIG. 11 shows cross-track 4 segment Reed-Solomon encoding of CWID and header CRC fields (reference numeral 1130) to generate 12-byte headers with Reed-Solomon parity byte substitution (reference numeral 1132).

Figure 12:
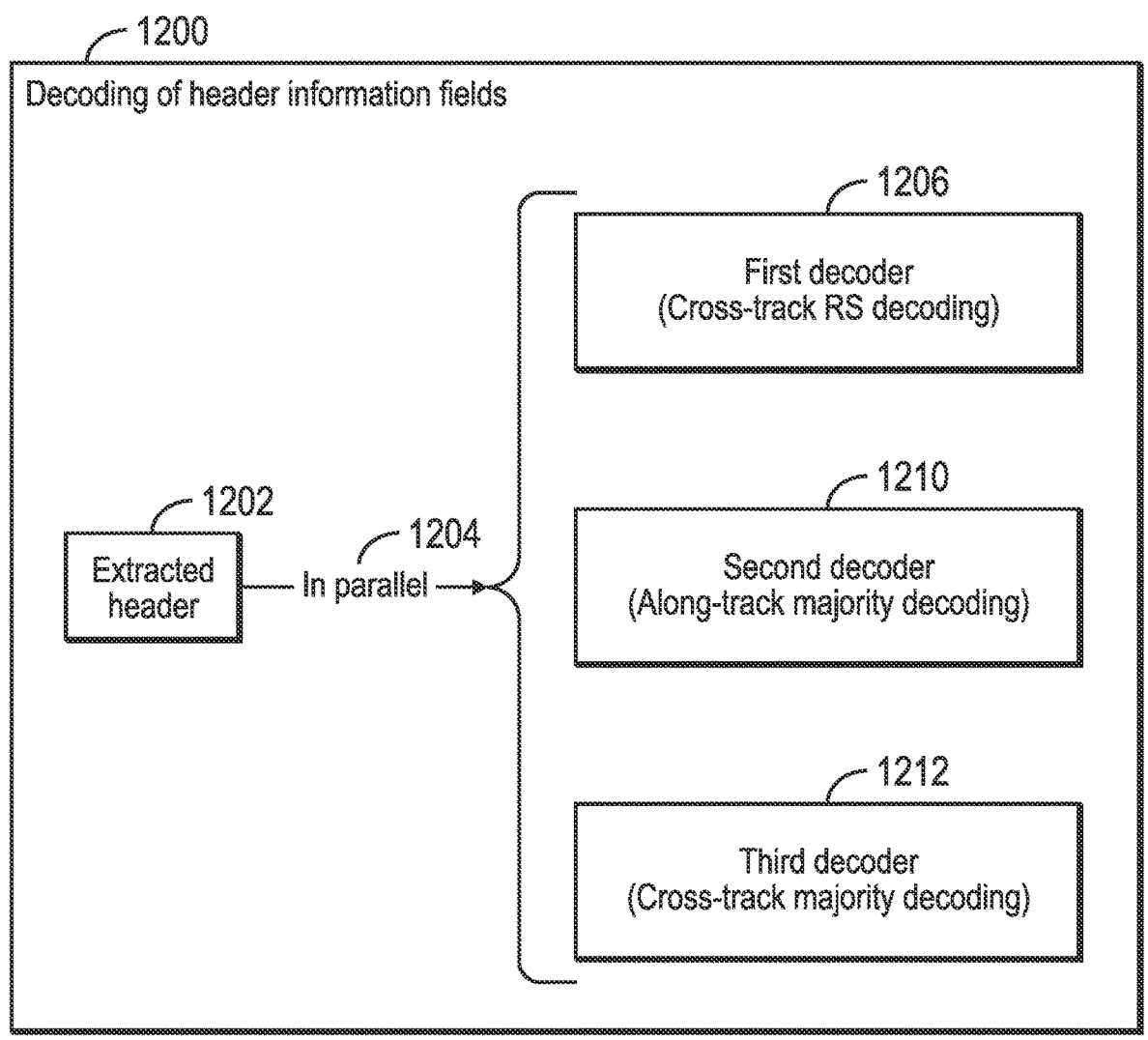
FIG. 12 illustrates a block diagram that shows decoding of header information fields, in accordance with certain embodiments.

FIG. 12 illustrates a block diagram 1200 that shows decoding of header information fields, in accordance with certain embodiments. The extracted header 1202 with Reed-Solomon encoding and other coding is processed in parallel (reference numeral 1204) by a first decoder 1206, a second decoder 1210, and a third decoder 1212.

The first decoder 1206 performs a cross-track Reed-Solomon decoding. The second decoder 1208 performs an along-track majority decoding. The third decoder 1212 performs a cross-track majority decoding.

Figure 13:
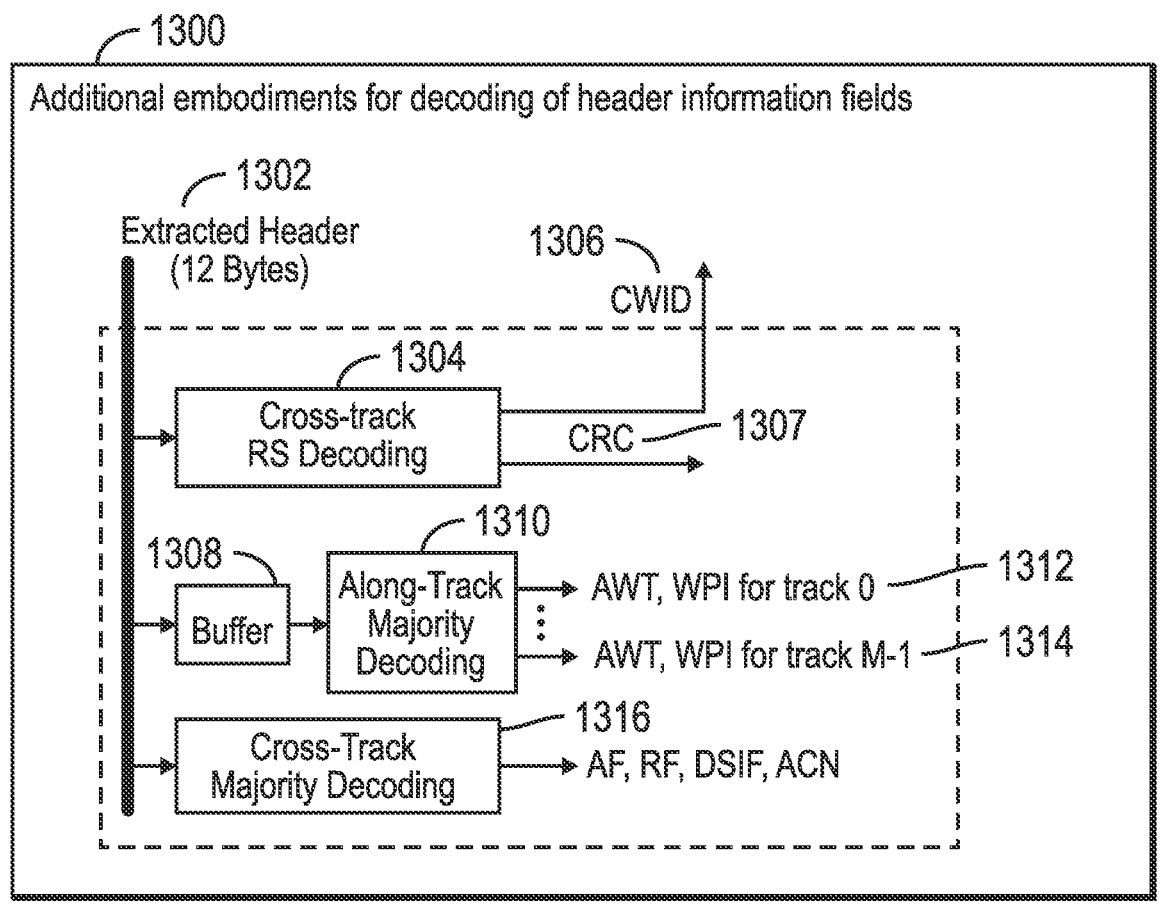
FIG. 13 illustrates a block diagram that shows decoding of header information fields, in accordance with certain embodiments.

FIG. 13 illustrates a block diagram 1300 that shows decoding of header information fields, in accordance with certain embodiments.

The 12 byte extracted headers of the M tracks (M is 32 in certain embodiments) are processed by the first decoder 1304 that performs cross-track Reed-Solomon decoding to correct errors and generate the CWID fields (bytes 5, 6) 1306 and header CRC fields (bytes 10, 11) 1307. This is analogous to a reverse of the encoding process shown in FIGS. 10, 11.

The extracted header 1302 is passed through a buffer 1308 and then through the second decoder 1310 that performs an along track majority decoding to generate the AWT and Write Pass Identifier (WPI) fields (bytes 6, 7, 8, 9 in FIG. 8) for each of the M tracks 1312, 1314.

The extracted header 1302 is processed by the third decoder 1316 that performs a cross-track majority decoding to generate the AF, RF, DSIF, and ACN fields shown in FIG. 8, where for the cross-track majority decoding only the original (i.e., no substituted) bytes 0 . . . 2 in each 12 byte header is used.

While FIGS. 1-13 have been described using bytes, it should be noted that bytes are symbols of 8 bits for historical reasons, but Reed-Solomon codes for symbols of size bigger or smaller than 8 bits exist and in alternative embodiments symbols other than 8 bits (e.g., 10 bit) may be used for data ECC.

Figure 14:
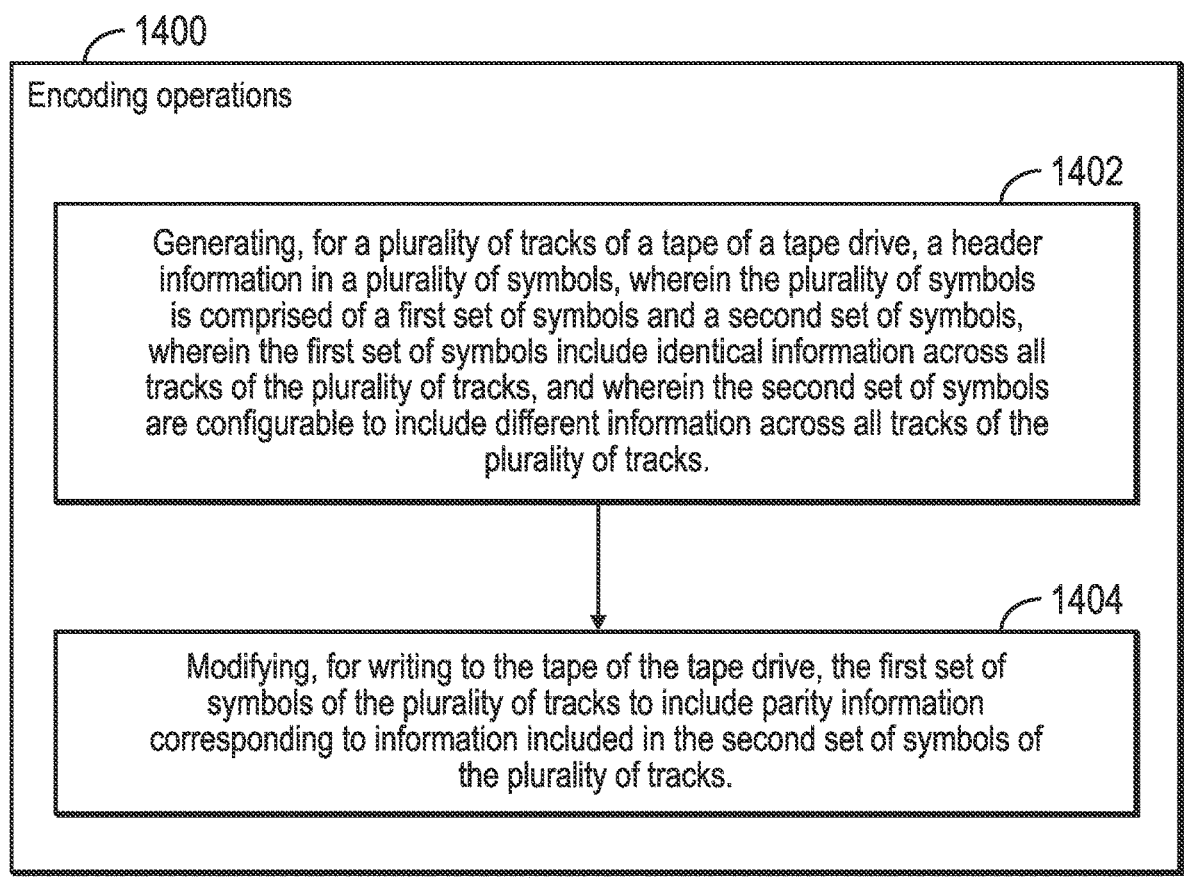
FIG. 14 illustrates a flowchart that shows operations for encoding of header information fields, in accordance with certain embodiments.

FIG. 14 illustrates a flowchart 1400 that shows operations for encoding of header information fields, in accordance with certain embodiments. Control starts at block 1402 in which operations are shown for generating, for a plurality of tracks of a tape of a tape drive 104, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks.

From block 1402 control proceeds to block 1404, in which a modification is made, for writing to the tape of the tape drive, of the first set of symbols of the plurality of tracks to include parity information corresponding to information included in the second set of symbols of the plurality of tracks.

Figure 15:
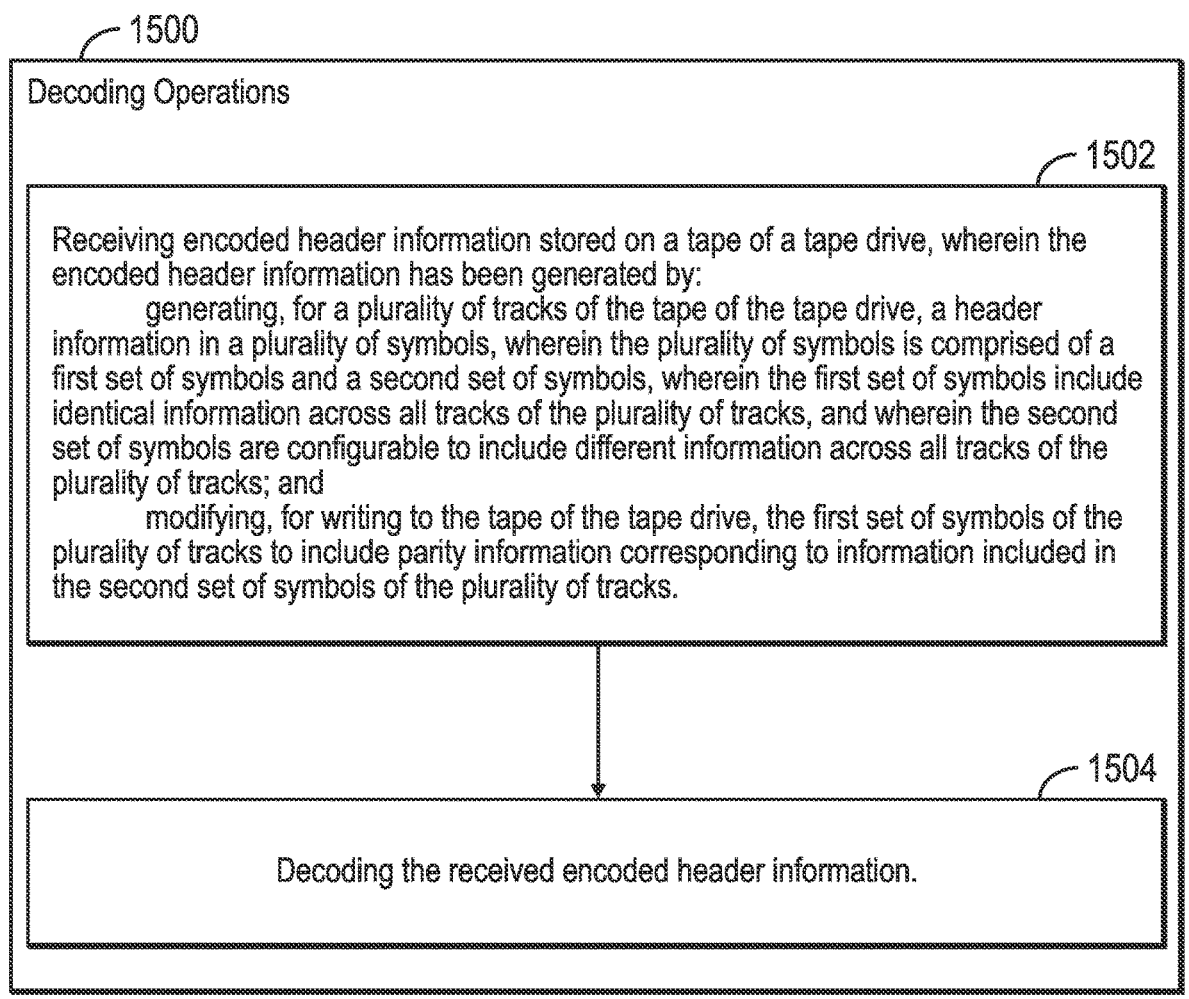
FIG. 15 illustrates a flowchart that shows operations for decoding of header information fields, in accordance with certain embodiments.

FIG. 15 illustrates a flowchart 1500 that shows operations for decoding of header information fields, in accordance with certain embodiments.

Control starts at block 1502 in which operations are shown for receiving encoded header information stored on a tape 118 of a tape drive 104, wherein the encoded header information has been generated by: generating, for a plurality of tracks of the tape of the tape drive, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks; and modifying, for writing to the tape of the tape drive, the first set of symbols of the plurality of tracks to include parity information corresponding to information included in the second set of symbols of the plurality of tracks.

From block 1502 control proceeds to block 1504 in which a decoding of the received encoded header information is performed.

Figure 16:
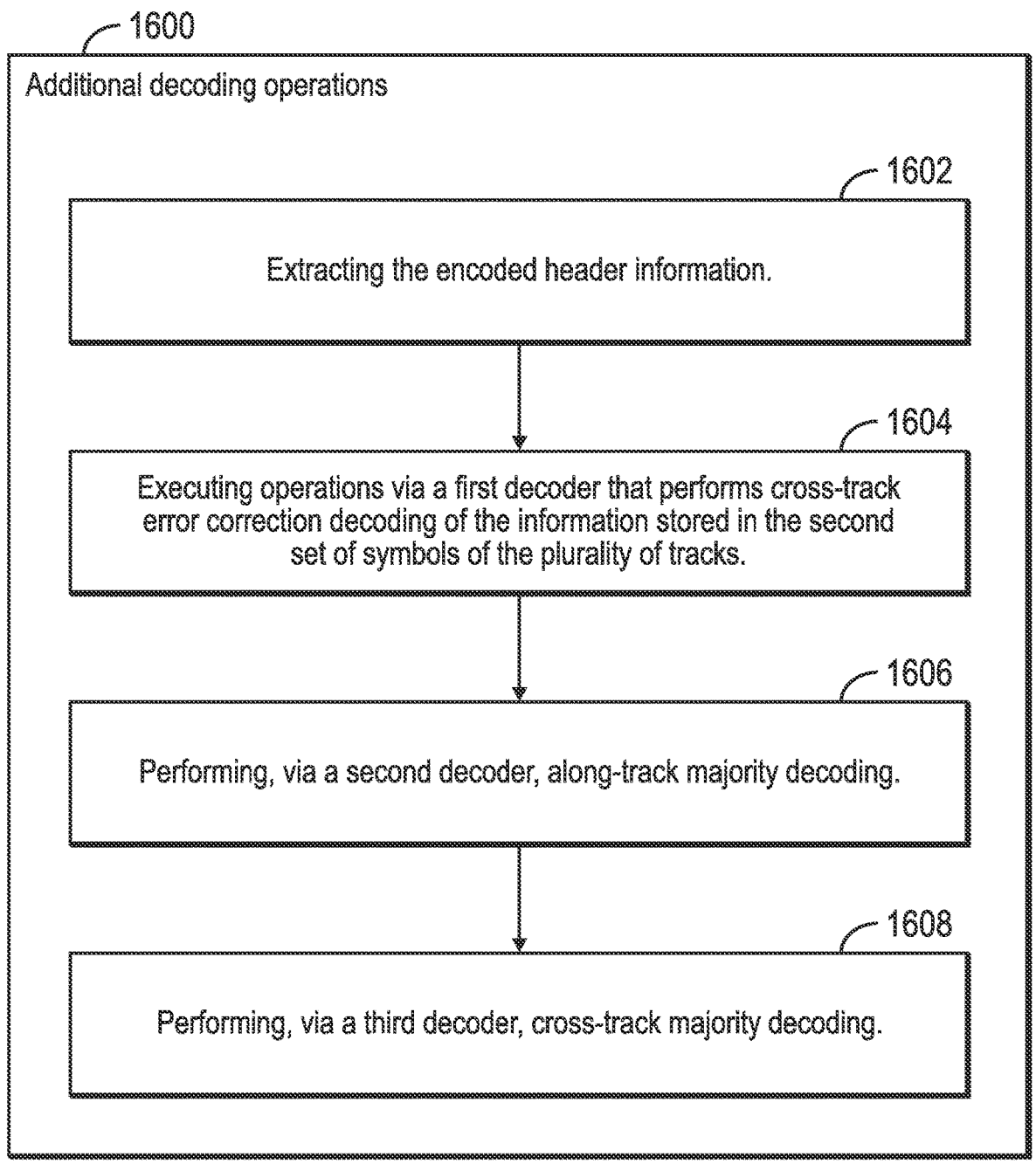
FIG. 16 illustrates a flowchart that shows additional operations for decoding of header information fields, in accordance with certain embodiments.

FIG. 16 illustrates a flowchart 1600 that shows additional operations for decoding of header information fields, in accordance with certain embodiments.

Control starts at block 1602 in which the encoded header information is extracted. Operations are executed at block 1604 via a first decoder 1206 that performs cross-track error correction decoding of the information stored in the second set of symbols of the plurality of tracks.

From block 1604 control proceeds to block 1606, in which a second decoder 1210 performs along-track majority decoding. From block 1606 control proceeds to block 1608 in which a third decoder 1212 performs cross-track majority decoding.

Therefore, certain embodiments shown in FIGS. 1-16 provide mechanisms for error encoding and decoding of header information separately from data information for a tape system. As a result, improvements are made to the operation of a tape drive.

Additional Embodiment Details

Various aspects of the present disclosure are described by narrative text, flowcharts, block diagrams of computer systems and/or block diagrams of the machine logic included in CPP embodiments. With respect to any flowcharts, depending upon the technology involved, the operations can be performed in a different order than what is shown in a given flowchart.

For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

The described operations may be implemented as a method, apparatus or CPP using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." The CPP may include a computer readable storage medium (or media) having computer readable program instructions thereon for causing a processor to carry out aspects of the present embodiments.

Figure 17:
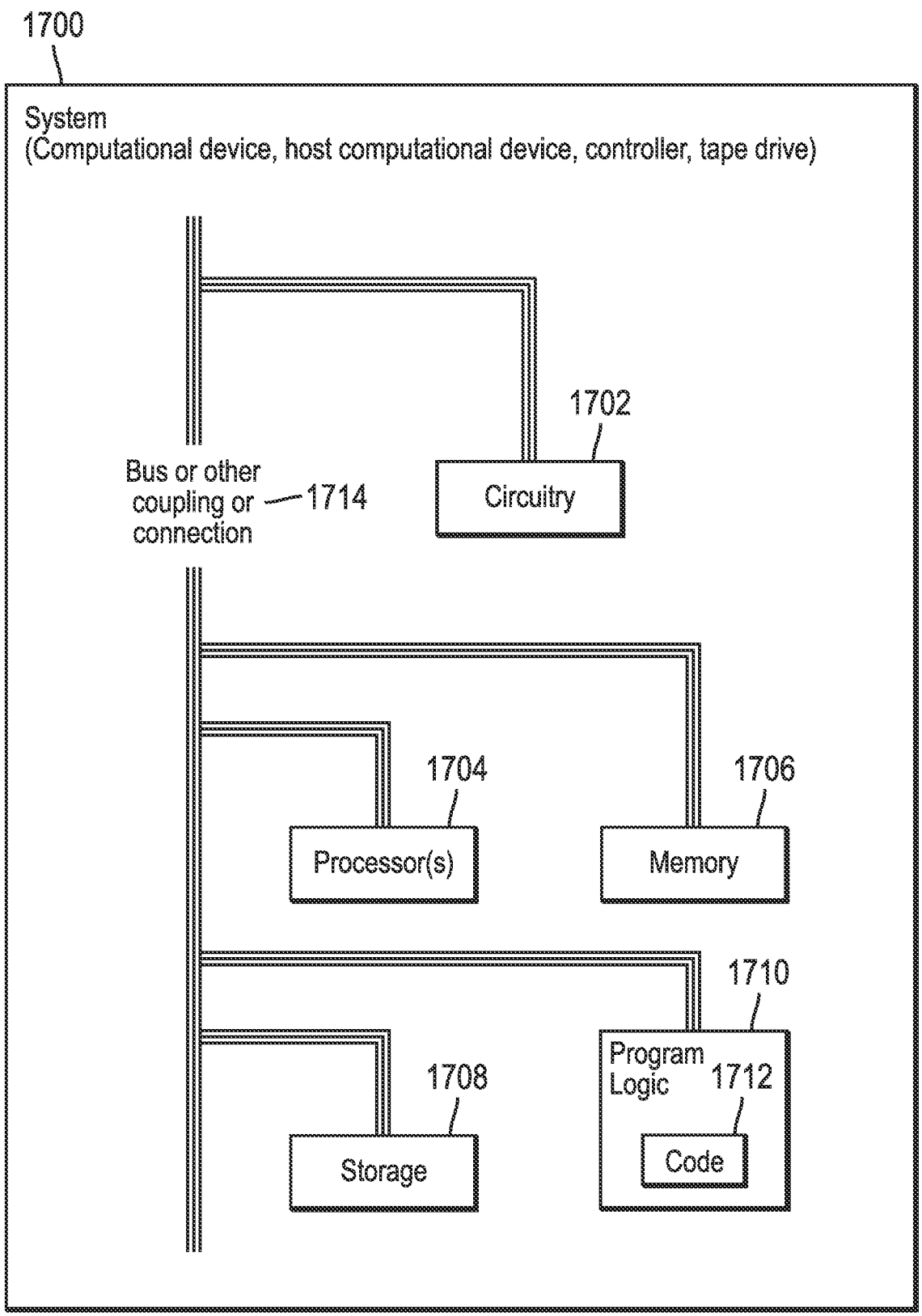
FIG. 17 illustrates a block diagram of a system that shows certain elements that may be included in a controller, a tape drive, and a host computational device as described in FIGS. 1-16, in accordance with certain embodiments.

FIG. 17 illustrates a block diagram of a system that shows certain elements that may be included in the tape drive 104, the controller 106, or the host computational device 102 (e.g., computational device), in accordance with certain embodiments. The system 1700 may include a circuitry 1702 that may in certain embodiments include at least a processor 1704. The system 1700 may also include a memory 1706 (e.g., a volatile memory device), and storage 1708. The storage 1708 may include a non-volatile memory device (e.g., EEPROM, ROM, PROM, flash, firmware, programmable logic, etc.), magnetic disk drive, optical disk drive, tape drive, etc. The storage 1708 may comprise an internal storage device, an attached storage device and/or a network accessible storage device. The system 1700 may include a program logic 1710 including code 1712 that may be loaded into the memory 1706 and executed by the processor 1704 or circuitry 1702. In certain embodiments, the program logic 1710 including code 1712 may be stored in the storage 1708. In certain other embodiments, the program logic 1710 may be implemented in the circuitry 1702. One or more of the components in the system 1700 may communicate via a bus or via other coupling or connection 1714. Therefore, while FIG. 17 shows the program logic 1710 separately from the other elements, the program logic 1710 may be implemented in the memory 1706 and/or the circuitry 1702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter the invention, the invention resides in the claims hereinafter appended.

* IBM is a trademark of International Business Machines Corporation registered in many jurisdictions worldwide.

What is claimed is:

1. A method, comprising:
   receiving encoded header information stored on a tape of a tape drive, wherein the encoded header information has been generated by:
      generating, for a plurality of tracks of the tape of the tape drive, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks; and
      modifying, for writing to the tape of the tape drive, the first set of symbols of the plurality of tracks to include parity information corresponding to information included in the second set of symbols of the plurality of tracks; and
   decoding the received encoded header information.

2. The method of claim 1, wherein the decoding of the received encoded header information comprises:
   extracting the encoded header information; and
   executing operations via a first decoder that performs cross-track error correction decoding of the information stored in the second set of symbols of the plurality of tracks.

3. The method of claim 2, wherein the decoding of the received encoded header information further comprises:
   performing, via a second decoder, along-track majority decoding; and performing, via a third decoder, cross-track majority decoding.

4. The method of claim 3, wherein the cross-track error correction decoding generates Codeword interleave designation (CWID) and Cyclic Redundancy Check (CRC) fields, wherein the along-track majority decoding generates Adjacent Wrap Toggle (AWT) and Write Pass Identifier (WPI) fields, and wherein the cross-track majority decoding generates Amble Flag (AF), Rewritten Flag (RF), Data Set Identifier Fragment (DSIF), and an Absolute Codeword Object Set Sequence Number (ACN) fields.

5. The method of claim 2, wherein the first decoder is a Reed-Solomon decoder.

6. The method of claim 1, wherein the received encoded header information is protected by header Error Correcting Code (ECC), wherein data information corresponding to the encoded header information is protected by data ECC, and the header ECC and the data ECC are computed independently of each other.

7. The method of claim 1, wherein within the encoded header information the parity information is distributed in a first portion of all of the first set of symbols over all of the plurality of tracks, and wherein a second portion of all of the first set of symbols over all of the plurality of tracks continues to store previously stored information.

8. A tape drive, comprising:
   a controller; and
   a tape head coupled to the controller, wherein the controller is configured to perform operations, the operations comprising:
   receiving encoded header information stored on a tape of a tape drive, wherein the encoded header information has been generated by:
      generating, for a plurality of tracks of the tape of the tape drive, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks; and
      modifying, for writing to the tape of the tape drive, the first set of symbols of the plurality of tracks to include parity information corresponding to information included in the second set of symbols of the plurality of tracks; and
   decoding the received encoded header information.

9. The tape drive of claim 8, wherein the header information is protected by header Error Correcting Code (ECC), wherein data information corresponding to the header information is protected by data ECC, and wherein the header ECC and the data ECC are computed independently of each other.

10. The tape drive of claim 8, wherein the parity information corresponding to information stored in the second set of symbols of the plurality of tracks comprises one or more parity symbols per header for each of the plurality of tracks.

11. The tape drive of claim 8, wherein the plurality of symbols also comprise a third set of symbols, and wherein the third set of symbols store information that is same along a track.

12. The tape drive of claim 8, wherein the parity information is distributed in a first portion of all of the first set of symbols over all of the plurality of tracks, and wherein a second portion of all of the first set of symbols over all of the plurality of tracks continues to store previously stored information.

13. The tape drive of claim 8, wherein the symbols are bytes, wherein the parity information corresponding to information stored in the second set of symbols of the plurality of tracks comprises one or more Reed-Solomon (RS) parity bytes per header for each of the plurality of tracks for a Codeword interleave (CWI-4) Set, and wherein:
- the plurality of bytes in a CWI-4 header are 12 in number;
- the first set of bytes comprise three bytes; and
- the second set of bytes comprise four bytes that include header Cyclic Redundancy Check (CRC) information and CWI-4 designation identifier.

14. The tape drive of claim 8, wherein the plurality of tracks are at least 8 in number, wherein a synchronized codeword object set represents the at least 8 tracks, and wherein each track stores two or more packets, and wherein each packet includes a headerized CWI.

15. A computer program product, the computer program product comprising a computer readable storage medium having computer readable program code embodied therewith, the computer readable program code configured to perform operations in a device, the operations comprising:
- receiving encoded header information stored on a tape of a tape drive, wherein the encoded header information has been generated by:
  - generating, for a plurality of tracks of the tape of the tape drive, a header information in a plurality of symbols, wherein the plurality of symbols is comprised of a first set of symbols and a second set of symbols, wherein the first set of symbols include identical information across all tracks of the plurality of tracks, and wherein the second set of symbols are configurable to include different information across all tracks of the plurality of tracks; and
  - modifying, for writing to the tape of the tape drive, the first set of symbols of the plurality of tracks to include parity information corresponding to information included in the second set of symbols of the plurality of tracks; and
- decoding the received encoded header information.

16. The computer program product of claim 15, wherein the header information is protected by header Error Correcting Code (ECC), wherein data information corresponding to the header information is protected by data ECC, and wherein the header ECC and the data ECC are computed independently of each other.

17. The computer program product of claim 15, wherein the parity information corresponding to information stored in the second set of symbols of the plurality of tracks comprises one or more parity symbols per header for each of the plurality of tracks.

18. The computer program product of claim 15, wherein the plurality of symbols also comprise a third set of symbols, and wherein the third set of symbols store information that is same along a track.

19. The computer program product of claim 15, wherein the parity information is distributed in a first portion of all of the first set of symbols over all of the plurality of tracks, and wherein a second portion of all of the first set of symbols over all of the plurality of tracks continues to store previously stored information.

20. The computer program product of claim 15, wherein the symbols are bytes, wherein the parity information corresponding to information stored in the second set of symbols of the plurality of tracks comprises one or more Reed-Solomon (RS) parity bytes per header for each of the plurality of tracks for a Codeword interleave (CWI-4) Set, and wherein:
- the plurality of bytes in a CWI-4 header are 12 in number;
- the first set of bytes comprise three bytes; and
- the second set of bytes comprise four bytes that include header Cyclic Redundancy Check (CRC) information and CWI-4 designation identifier.

* * * * *